United States Patent [19]

Miczek

[11] 3,862,827

[45] Jan. 28, 1975

[54] WEST DUST COLLECTOR WITH CONCURRENT FLOW CONTACTING CHAMBER

[76] Inventor: Gerhard Miczek, 1501 Cowling Ave., Louisville, Ky. 40205

[22] Filed: Oct. 24, 1972

[21] Appl. No.: 300,431

[52] U.S. Cl. .................. 55/238, 55/241, 261/79 A, 261/117
[51] Int. Cl. ............................................. B01d 47/10
[58] Field of Search ............ 55/223, 224, 235, 236, 55/237, 238, 241, 240, 258, 445; 261/79 A, 109, 112, 115, 117

[56] References Cited
UNITED STATES PATENTS

| | | | |
|---|---|---|---|
| 784,748 | 3/1905 | Meehan | 261/111 |
| 2,235,998 | 3/1941 | Kleinschmidt | 261/79A |
| 2,250,757 | 7/1941 | Fisher | 55/238 |
| 2,351,864 | 6/1944 | Linderman | 261/79 A |
| 2,396,526 | 3/1946 | Nilsson | 55/238 |
| 2,509,817 | 5/1950 | Foreman | 55/236 |
| 2,575,359 | 11/1951 | Ortgies | 55/236 |
| 3,258,895 | 7/1966 | Wiebe et al. | 55/233 |
| 3,296,774 | 1/1967 | Hoogendoorn et al. | 55/238 |
| 3,324,632 | 6/1967 | Berneike et al. | 55/236 |
| 3,601,374 | 8/1971 | Wheeler | 261/109 |

Primary Examiner—Frank W. Lutter
Assistant Examiner—David L. Lacey
Attorney, Agent, or Firm—Donald L. Cox

[57] ABSTRACT

A wet dust collector is described having a cylindrical contacting chamber with a tangential gas inlet and liquid supply inlet located at one end of said contacting chamber supplying respectively the gas to be cleaned and the liquid cleaning agent. Said apparatus is further equipped with ringlike flats arranged perpendicular to the axis of said chamber and with a gas, liquid and droplets outlet forming the other end of the contacting chamber opposite from the end having said liquid and gas inlets.

2 Claims, 3 Drawing Figures

PATENTED JAN 28 1975　　　　　　　　　　3,862,827

WEST DUST COLLECTOR WITH CONCURRENT FLOW CONTACTING CHAMBER

BACKGROUND OF THE INVENTION

The control of atmospheric pollution has been of prime importance to industries that exhaust waste effluents into the atmosphere. Many of the devices utilized to clean effluent gases have utilized the concept of contacting the effluent gas with a liquid flow to remove undesirable particulate matter from the gas.

Most solutions to these problems presently being examined have been found to be highly sophisticated, costly and difficult to maintain. Perhaps the most pressing problems have been the degree of operating efficiency, the quantity of liquid used and limited velocities at which gases may be introduced.

In co-pending U.S. Pat. application Ser. No. 151213 filed June 9, 1971, now U.S. Pat. No. 3,722,185, issued March 27, 1973, the instant inventor disclosed a gas scrubbing method and apparatus whereby water was introduced into a contacting chamber from the top while the gas to be cleaned was introduced near the bottom.

While providing a solution to some of the aforementioned problems, this apparatus is operable only at average axial gas velocities (as defined hereinafter) below 1,000 feet per minute. Attempts to operate this apparatus at velocities in excess of this have resulted in an increase in the amount of water carried away in the cleaned gas, or a reduction in the gas cleaning efficiency.

SUMMARY OF INVENTION

This invention has been designed to eliminate or greatly reduce the previously mentioned problems and to be operable in a low cost and easy-to-use and maintain gas cleaning system. Perhaps most significantly with the instant invention, is its operability at average gas flow rates in the contacting chamber in excess of 1,400 feet per minute. In addition, utilizing this invention it is possible to introduce gases through the tangential inlet into the contacting chamber with unlimited velocities and still maintain acceptable gas cleaning action.

While the prior art has sought to combine the steps of cleaning the gas and eliminating the liquid used from the cleaned gas, it has been discovered that for higher efficiencies based on higher gas velocities it is necessary to separate the cleaning step from the liquid removal step. By separating these two functions, it is possible to arrange the liquid flow generally concurrently with the flow of the gas to be cleaned. In other words, the cleaning liquid and the gas are introduced into the contacting chamber at the same end of the cleaning apparatus and the clean gas and the dirty liquid are removed at the opposite end. Thus, at the gas outlet of the chamber contemplated herein the gas is still in a "wet" stage and must be subject to liquid elimination, by well known methods outside the contacting chamber.

By carrying out these two distinct steps and allowing the gas and liquid to flow concurrently, the velocity of the gas (which is introduced tangentially into the chamber) can be increased virtually without restriction. Furthermore, once water has been removed from the wet gas after the cleaning action in the contacting chamber, it can be recirculated many times through the contacting chamber, allowing a decrease in the amount of cleaning liquid actually utilized. With the prior art separators this could not be done without difficulties because of the large number of water inlets required and the small diameter of the liquid inlet hole or tube which tended to become clogged where "dirty" liquid was recycled. By utilizing this apparatus it is possible to achieve an increase in the average axial velocity (as further defined herein) of the gas in the contacting chamber above 1,400 feet per minute. In addition, smaller diameter contacting chambers may be utilized which in turn, generate a higher centrifugal force and higher gas cleaning efficiency.

The instant invention involves a wet collector for collecting dust and aerosol particles carried in gas which comprises a cylindrical contacting chamber having attached thereto and mounted tangentially to the wall of the chamber, a gas inlet. This inlet is disposed at one end of the contacting chamber. Also disposed near the same end of the chamber is the inlet for the cleaning liquid. Said liquid inlet can be attached so that the cleaning liquid either is introduced in a tangential direction on the inner wall of the contacting chamber or is jetted in any direction into the contacting chamber generally either parallel to the surface of the cover closing the inlet end of the contacting chamber or against said cover.

A portion of the length of the contacting chamber is equipped with ringlike flats. This portion is at least as long as the length of the tangential inlet. The rings are parallel to each other and generally perpendicular to the axis of the cylinderical contacting chamber and their outer circular edges are attached to the inner wall of the contacting chamber. Preferably a section of each ring with the exception of the ring the most distant from the cover, is cut out, leaving an open area. The openings are then arranged along the tangential inlet so that the rings do not obstruct the entering gas flow. The purpose of the flats is to reduce the flow of liquid in the axial direction and, thus, to reduce the actual amount of liquid needed.

As used herein, the term "average axial velocity," when referring to the velocity of the gas in the cylindrical contacting chamber, is determined by dividing the volume of gas introduced into the chamber per unit time by the crosssectional area of the contacting chamber neglecting the ringlike flats. The diameter required of the cylindrical contacting chamber D (in feet) for a given volume of gas is preferably defined by the formula:

$$D < 0.03 \sqrt{Q}.$$

where Q is the volume of the gas introduced into the chamber per unit time (in cubic feet per minute).

DETAILED DESCRIPTION OF THE DRAWING

In order to more fully explain the invention herein, by way of example the attached drawings are included.

Figure 1:
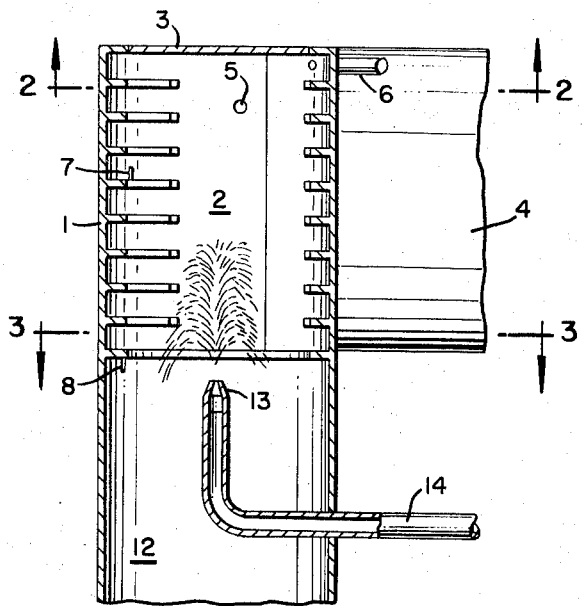
FIG. 1 is an elevational view of a vertical section of the apparatus of the instant invention.
Figure 2:
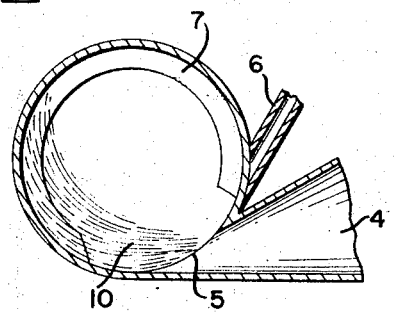
FIG. 2 is a horizontal view of the same invention, along the line 2—2.
Figure 3:
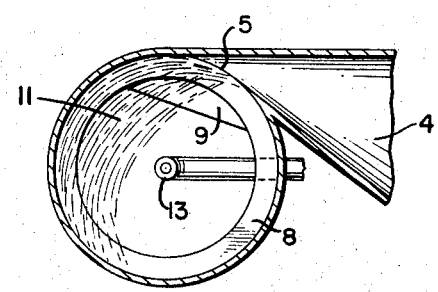
FIG. 3 is the view in the horizontal section along the lines 3—3 of FIG. 1.

As shown in FIGS. 1, 2 and 3 the structure of the instant invention comprises a vertically elongated tubular casing (1) defining an internal contacting chamber (2).

The inlet end of the chamber is sealed by means of a cover (3). Attached tangentially to the contacting chamber is a gas inlet duct (4) which opens into the contacting chamber by means of a tangential gas inlet (5).

At the inlet end of the contacting chamber near the cover the main liquid inlet (6) is located. Although this inlet may be arranged in any convenient manner and need not direct the flow of liquid at any particular direction, it is here preferred that the flow of liquid enters the contacting chamber in the same circumferential direction as the entering gas flow. Where large sized contacting chambers are utilized additional liquid inlets or tubes may be provided arranged circularly around the contacting chamber near the cover (3) or in the space between the first few rings one liquid inlet below the other. Preferably, no more than 1 to 4 of such liquid inlets need be utilized in the instant invention. By utilizing this exceedingly small number of liquid inlets, it is possible to recirculate the "dirty" liquid without fear of clogging these liquid inlets. In previous apparatuses, a great number of small tubes were utilized and the use of recirculated dirty liquid was risky because of the possibility of clogging the liquid supply tubes.

In the contacting chamber at its inlet end there are ringlike plates or flats (7 and 8) rigid in nature, arranged generally perpendicular to the axis of the contacting chamber and parallel to each other. The outer circular edges of these flats are attached to the inner wall of the contacting chamber. As previously mentioned, a portion (section) of each ring (7) is preferably cut away where the tangential gas inlet (5) communicates with the contacting chamber (2) so as not to obstruct the entering gas flow. The bottom most ring (8) built below the tangential gas inlet has no such cut away section and preferably is equipped with an additional plate which is located in-line with the cut-away sections of the other flats.

The gas coming in the gas inlet duct (4) to the contacting chamber (2) enters said chamber through the tangential gas inlet (5). The tangential gas entry creates in the contacting chamber a gas whirl so that the gas flow pattern has circumferential and axial components. The main amount of cleaning liquid is brought into the contacting chamber near the cover (3) through the liquid inlet (6) and is driven by the circumferential components of the gas flow in a circular motion around the chamber. The ringlike flats (7) prevent the liquid from being quickly driven out of the space of the tangential gas inlet by the axial components of the gas flow. The liquid is atomized by the entering gas, as it reaches the inner edge of the tangential gas inlet, and thereby, forms a droplet curtain (10) which together with the centrifugel force collects dust or aerosol particles in the cleaning liquid.

The last ring (8) attached to the contacting chamber, below the tangential gas inlet (5) and its extention plate (9) intersect the axial components of the gas flow near the inner wall of the contacting chamber and the liquid driven on the surface of this ring (8) creates an additional droplet curtain (11) perpendicular to the axis of the contacting chamber providing additional improved cleaning efficiency.

After passing the last ringlike flat (8), gas, liquid and liquid droplets carrying the collected dust and aerosol particles leave the contacting chamber through the outlet (12). The liquid is then separated from the clean gas in any conventional liquid eliminator.

Dust particles which pass the droplets curtains (10) and (11) without being collected and which are too small to be carried away from the space around the axis of the contacting chamber to the inner surface of said chamber by means of centrifugal forces may escape from the contacting chamber uncollected. To separate these dust particles from the gas preferably a liquid spray nozzle or nozzles (13) are placed in the center of the contacting chamber near its outlet end (12). This spray nozzle or nozzles are designed to direct a spray of additional cleaning liquid supplied by pipe (14) against the gas flow in the center portion of the contacting chamber.

The preceding written description and the drawings attached hereto are meant only as preferred embodiments of the invention and it is intended that the appended claims be referred to for specific definition of the invention. It is likewise understood that various equivelant constructions and modifications may be resorted to without departing from the scope and spirit of the invention described herein.

What is claimed is:

1. An apparatus for removing dust or other aerosol particles from a gas comprising:
    a. an elongated tubular casing defining a cylindrical contacting chamber having a cover enclosing one end of said chamber and a gas liquid droplet outlet disposed at the opposite end of said contacting chamber;
    b. a plurality of vertically spaced ring-like flats having their outer edges attached to the walls of the chamber, arranged perpendicular to the axis of the chamber immediately below said enclosing cover;
    c. a means for introducing the gas tangentially into said contacting chamber in the area between the ringlike flats, so as to create a flow of gas around the interior of the chamber; and
    d. a means for supplying liquid to the interior of said chamber and onto the uppermost ring-like flat, wherein said means is disposed at the opposite end of said contacting chamber from the gas liquid and droplet outlet.

2. The apparatus of claim 1 wherein a spray nozzle is arranged within the axis of said chamber and is provided with means for supplying additional liquid.

* * * * *